METHOD OF MAKING MAGNETIC HEADS WITH MEANS FOR PREVENTING SIDE EROSION

Original Filed Sept. 20, 1961

INVENTORS
SIMON DUINKER
JULES BOS
BY
Frank R. Trifari
AGENT 3,584,378

METHOD OF MAKING MAGNETIC HEADS WITH MEANS FOR PREVENTING SIDE EROSION

Simon Duinker, Hamburg, Germany, and Jules Bos, Emmasingel, Eindhoven, Netherlands, assignors to U.S. Philips Corporation, New York, N.Y.

Continuation of application Ser. No. 527,871, Feb. 16, 1966, which is a division of application Ser. No. 139,468, Sept. 20, 1961, now Patent No. 3,249,700. This application Sept. 7, 1969, Ser. No. 866,111
Int. Cl. H01f 7/06
U.S. Cl. 29—603 1 Claim

ABSTRACT OF THE DISCLOSURE

A method of manufacturing a magnetic head with a high resistance to wear includes the steps of joining first and second pole pieces with a non-magnetic material having a first softening temperature, and then placing a second nonmagnetic material having a second softening temperature lower than the first softening temperature of the first nonmagnetic material around the pole pieces surrounding the running surface of the magnetic head. The non-magnetic material has resistance to wear characteristics approximately equal to that of the material of which the pole pieces are constructed. In a further embodiment, the steps are reversed as are the softening temperatures.

Figure 1:
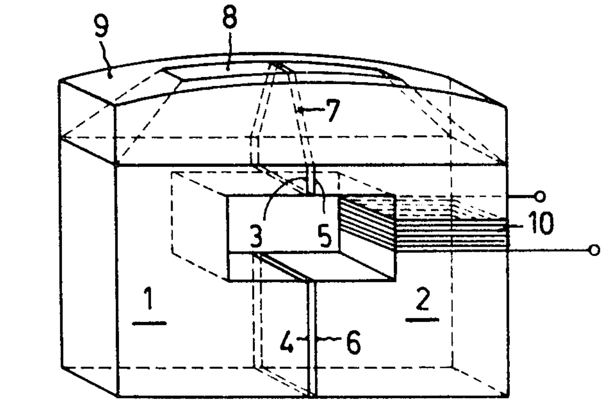

This application is a continuation of Ser. No. 527,871, filed Feb. 16, 1966, now abandoned and which was in turn a division of Ser. No. 139,468, filed Sept. 20, 1961, now Pat. No. 3,249,700.

This invention relates to annular magnetic heads for writing, reproducing and/or erasing magnetic recordings in a narrow track of a magnetic record carrier, comprising at least two circuit parts of sintered oxidic ferromagnetic material which are separated by a useful gap filled with material which serves as a non-magnetic material to protect the gap and also mechanically to joint the two circuit parts.

The term "annular magnetic head" is to be understood in this connection to mean a magnetic head the circuit parts of which in the assembled state enclose a central space in which one or more coils may be housed.

Narrow tracks of, for example, 0.25 mm. or even less occur inter alia in magnetic record carriers for recording video-information.

When using such a magnetic head, which usually has a very narrow guide surface because of the narrowness of the track on the record carrier, its length of life is found to be determined by the extent of crumbling off of the sides of the head, the useful track width of the head gradually decreasing due to such crumbling off.

Efforts have been made to avoid crumbling off of the sides of the head by encapsulating the head in casting resin, but the resin wears away comparatively soon by the action of forces exerted upon the head by the carrier, since these forces may be considerable due to the high relative speed of the head with respect to the carrier (25 m./sec. or more).

When the casting resin has worn away, however attack of the sides of the head is no longer prevented.

Efforts have also been made to protect the sides of the head by supporting them with the aid of unmagnetic side plates, for example of quartz. This step is found to be little effective because of the fact that such side plates can not be secured to the ferromagnetic circuit without forming seams.

An object of the invention is to mitigate the above-mentioned disadvantages and a magnetic head according to the invention for this purpose is characterized in that the sides of that portion of the head which includes the useful gap are each covered with a self-adhering layer of unmagnetic material having a mechanical strength and more particularly a resistivity to wear which is of the same order of magnitude as that of the sintered oxidic ferromagnetic material, and that those edges of the layers which are adjacent the magnetic carrier during operation of the head, are co-planar with the guide surface at least in the direct vicinity of the gap of the head.

The invention also relates to methods for the manufacture of such magnetic heads.

A first method according to the invention is characterized in that at least the sides of that portion of the head which already includes the gap filled with unmagnetic material are covered with a second unmagnetic material which adheres of its own accord to the ferromagnetic material by the use of a thermal treatment and which, in the cooled state, has a mechanical strength and more particularly a resistivity to wear which is of the same order of magnitude as that of the sintered oxidic ferromagnetic material, but that the temperatures occurring during the thermal treatment are lower than the temperature at which the unmagnetic material with which the gap is filled starts to deform.

A second method according to the invention is characterized in that at least the sides of those portions of the head which are separated by the useful gap in the finished product are covered with an unmagnetic material which adheres of its own accord to the ferromagnetic material by the use of a thermal treatment and which, in the cooled state, has a mechanical strength and more particularly a resistivity to wear about equal to that of the sintered oxidic ferromagnetic material, that accurately processed gap-forming surfaces of the parts thus provided on their sides with unmagnetic material are placed against each other with the interposition of a second unmagnetic material which likewise adheres of its own accord to the ferromagnetic material by the use of a thermal treatment, these parts being pressed against each other at a pressure such that, in the cooled state, the width of the gap between the two parts corresponds to the desired width of the useful gap, this second unmagnetic material in the cooled state likewise having a mechanical strength and more particularly a resistivity to wear which is about equal to that of the sintered oxidic ferromagnetic material, but that the temperatures occurring during the last-mentioned thermal treatment are lower than the temperature at which the unmagnetic material covering the sides of the head starts to deform.

It is to be noted that the unmagnetic materials employed preferably have coefficients of expansion substantially equal to the corresponding coefficient or expansion of the sintered oxidic ferromagnetic material for the whole temperature range of the thermal treatments.

In order that the invention may be readily carried into effect, two embodiments will now be described in detail, by way of example, with reference to the accompanying diagrammatic drawing, in which:

FIG. 1 shows two circuit parts 1 and 2 of sintered oxidic material. Each circuit part has two accurately processed surfaces 3, 4 and 5, 6 respectively. A gap 7 formed by the surfaces 3 and 5 and along which the magnetic record carrier is guided, is filled with a material which serves as a non-magnetic material to protect the gap and also mechanically to joint the two circuit parts.

Examples of such materials are glass, solder and water-glass.

By preferably providing that the contact surface of the surfaces 4 and 6 is large relative to the contact surface of the surfaces 3 and 5, it is ensured that the magnetic reluctance produced by the gap between the surfaces 4 and 6 is low relative to the magnetic reluctance produced by the gap between the surfaces 3 and 5. The surfaces 4 and 6 may be joined in any desired manner. For these surfaces it is also possible to use, for example, an adhesion with the aid of glass, solder or water-glass.

In the manufacture of such a head, for example of foil of solder or glass is provided between the surfaces 3 and 5 and also between the surfaces 4 and 6.

The assembly is then heated to a temperature at which the solder or the glass has melted or softened. Subsequently, the circuit parts with the interposed solder or glass in the molten or softened state are pressed one on the other at a pressure such that the gap between the surfaces 3 and 5 has the width desired. After cooling of the assembly, a guide surface 8 at the upper side of the head is obtained by accurate processing, for example polishing.

Another method for the manufacture of such a head is the following. Each of the accurately processed surfaces 3, 4, 5 and 6 is covered, for example, wtih a thin liquid layer of water-glass.

The circuit parts thus with thin liquid layers of water-glass are then heated to a suitable temperature (800° to 900° C. with a solution of water-glass containing from 7% to 9% by weight of $Na_2O$ and from 24% to 27% by weight of $SiO_2$) so that the waterglass layers vitrify. The surfaces of the circuit parts 1 and 2 thus covered with vitrified waterglass layers are placed against each other. After heating to a suitable temperature (likewise 880° to 900° C. in example chosen) the waterglass hardens upon cooling into a layer which has adhered to the ferromagnetic material and which has a mechanical strength about equal to that of the ferro-magnetic material.

Of the assembly obtained in one of the above-described manners, for example the portion including the useful gap is then immersed into a liquefied second unmagnetic material which, as the gap-filling material, has the property of adhering of its own accord to the ferromagnetic material upon passing from the liquid state to the solid state, and which in the solid state has a mechanical strength and more particularly a resistivity to wear about equal to that of the ferromagnetic material. However, the temperatures occurring during the thermal treatment requiring therefor must naturally not be so high that the gap-filling material deforms, for example liquefies again. Thus, if for example glass or solder is used as the second unmagnetic material, the temperature at which this glass or solder is in the liquid state must not be so high that, when the portion of the head including the useful gap contacts with the softened glass or the molten solder, the gap-filling material also starts softening or melting. If water-glass is used as the second unmagnetic material, the temperature required for vitrifying this water-glass must likewise not be so high that the gap-filling material deforms. A single example may be mentioned to illustrate this. A glass is used as the gap-filling material which has, for example, the following composition:

| | Percent of weight |
|---|---|
| $SiO_2$ | 76.6 |
| $CaO$ | 4.6 |
| $MgO$ | 3.1 |
| $Al_2O_3$ | 1.0 |
| $Na_2O$ | 14.3 |
| $K_2O$ | 0.3 |
| $Fe_2O_3$ | 0.075 |
| $TiO_2$ | 0.03 |
| $MnO$ | 0.004 |
| $CuO$ | 0.0003 |

This glass starts to soften between 650° and 700° C. The second unmagnetic material used for covering the sides of the head in the vicinity of the gap is, for example, a glass (enamel) of the following composition:

| | Percent by weight |
|---|---|
| $B_2O_3$ | 15.3 |
| $PbO$ | 64.0 |
| $ZnO$ | 10.8 |
| $CoO$ | 0.9 |
| $SiO_2$ | 9.0 |

This glass starts to soften at about 550° C.

When the second unmagnetic material has cooled down and adhered to the ferromagnetic material, the excess material present above the guide circuit 8 is removed by grinding and polishing so that the guide surface of the head is again free of the second unmagnetic material and that the edges of this material on the sides of the head, at least in the vicinity of the gap, are co-planar with the guide surface of the head. A resulting layer 9, formed by the second unmagnetic material on the sides of the head in the vicinity of the useful gap, is found to afford effective protection against crumbling off of the sides by the action of the forces exerted upon the head by the magnetic record carrier.

In FIG. 1, the coil to which the signals to be recorded are supplied during the recording process and from which the recorded signals are derived during the reading process surrounds the core part 2 and is indicated by 10.

Figure 2:
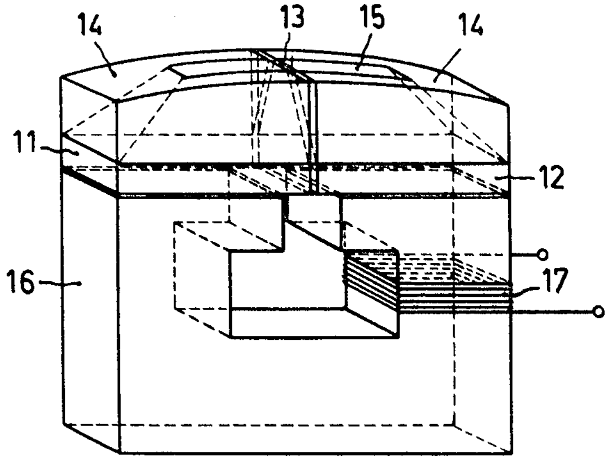

FIG. 2 shows a second example of a magnetic head according to the invention. Circuit parts 11 and 12, separated by a useful gap 13 in the finished product, constitute in this example only the pole-piece of the head. The sides of these circuit parts are covered with an unmagnetic material 14 by the use of a thermal treatment, which material adheres of its own accord to the ferromagnetic material of the circuit parts by the action of a thermal treatment and again, has, in the cooled state, a mechanical strength and a resistivity to wear of the same order of magnitude as that of the sintered oxidic ferromagnetic material. After cooling, the non-magnetic material which, during its provision on the sides, has found its way onto the gap-forming surfaces, is removed in a manner such that the edges of the layers of unmagnetic material which are adjacent to the gap are co-planar with the gap-forming surfaces.

The gap-forming surfaces of the circuit parts 11 and 12 thus provided with protective layers are then placed against each other with the interposition of a second unmagnetic material which likewise adheres of its own accord to the ferromagnetic material by the use of a thermal treatment, the circuit parts during this treatment being pressed against each other at a pressure such that, in the cooled state, the width of the gap between the parts 11 and 12 corresponds to the desired width of the useful gap. In the cooled state, the second unmagnetic material likewise has a mechanical strength and more particularly resistivity to wear about equal to that of the sintered oxidic ferromagnetic material.

In this case also it is necessary to ensure that the temperatures occurring during the last-mentioned thermal treatment are lower than the temperature at which the unmagnetic material 14 starts to deform. Thus, the material used as a gap-filling material in the head of FIG. 1 may serve as the material 14 and the material used in the head of FIG. 1 for covering the sides of the head in the vicinity of the useful gap may serve as the gap-filling material.

Finally, the excess material 14 and also the excess gap-filling material present above a guide surface 15 are removed by grinding and polishing in a manner such that the guide surface of the head is free again and that these edges of the unmagnetic materials which are adjacent the magnetic carrier during operation of the head are co-planar with the guide surface 15 at least in the vicinity of the gap.

The head is completed by a closure piece 16 on which a coil 17 is arranged. The pole-piece may be connected to the closure yoke 16, for example with the aid of an adhesive or by mechanical means such as the claps.

The material of the closure piece 16 is preferably also sintered oxidic ferromagnetic material.

We claim:

1. A method of manufacturing an annular magnetic head having at least two circuit parts composed of sintered oxidic ferromagnetic material and a useful gap between said circuit parts, each part having gap forming surfaces and guid portions with surfaces thereon, comprising the steps of covering a portion of each of said parts including said gap forming surfaces and said guide surfaces with a first nonmagnetic material having a first softening temperature range, heating each of said circuit parts and the associated first nonmagnetic material to said first softening temperature range, cooling said circuit parts, polishing the gap-forming surface of each circuit to remove the first nonmagnetic material therefrom, interposing a second nonmagnetic material directly between and contacting each said polished gap-forming surface, said second nonmagnetic material having a second softening temperature range below said first softening temperature range, heating the resultant assembly to said second temperature range and compressing the two circuit parts against said second nonmagnetic material until the desired gap length is achieved, and cooling said assembly, said first and second nonmagnetic materials being bonded to said sintered oxidic ferromagnetic material when cooled.

References Cited

UNITED STATES PATENTS

| | | | |
|---|---|---|---|
| 2,642,633 | 6/1953 | Dalton. | |
| 2,674,031 | 4/1954 | Buhrendorf | 29—603 |
| 3,098,126 | 7/1963 | Kaspaul | 179—100.2 |
| 3,145,452 | 8/1964 | Camras | 29—603 |
| 3,163,720 | 12/1964 | Netznik | 179—100.2 |
| 3,268,987 | 8/1966 | Adams et al. | 29—603 |
| 3,177,475 | 4/1965 | Bos et al. | |

FOREIGN PATENTS

| | | |
|---|---|---|
| 216,862 | 1/1958 | Australia. |
| 248,894 | 9/1959 | Australia. |
| 546,265 | 9/1957 | Canada. |

JOHN F. CAMPBELL, Primary Examiner

C. E. HALL, Assistant Examiner

U.S. Cl. X.R.

179—100.2; 340—174.1